(12) United States Patent
Cohen (10) Patent No.: US 7,218,424 B2
(45) Date of Patent: May 15, 2007

(54) FACSIMILE TRANSMISSION OVER PACKET NETWORKS WITH DELIVERY NOTIFICATION

(75) Inventor: Simona Cohen, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 51 days.

(21) Appl. No.: 11/120,523

(22) Filed: May 2, 2005

(65) Prior Publication Data

US 2005/0200891 A1 Sep. 15, 2005

Related U.S. Application Data

(63) Continuation of application No. 09/653,181, filed on Aug. 31, 2000, now Pat. No. 6,956,677.

(51) Int. Cl.
*H04N 1/00* (2006.01)
*H04M 11/00* (2006.01)
(52) U.S. Cl. .................. 358/435; 358/434; 358/436; 358/437; 358/438; 358/439; 358/1.15; 379/100.05; 379/100.06; 379/100.09; 379/100.17
(58) Field of Classification Search ........... 379/100.05, 379/100.06, 100.09, 100.17; 358/434–439, 358/1.15
See application file for complete search history.

(56) References Cited

U.S. PATENT DOCUMENTS

| 5,546,388 | A | * | 8/1996 | Lin ............................ 370/389 |
| 5,835,579 | A | * | 11/1998 | Gersi et al. ............ 379/100.17 |
| 5,881,064 | A | * | 3/1999 | Lin et al. ..................... 370/389 |
| 6,335,803 | B1 | * | 1/2002 | Chimura et al. ............ 358/434 |
| 6,339,481 | B1 | * | 1/2002 | Scott .......................... 358/442 |
| 6,381,038 | B1 | * | 4/2002 | Endo .......................... 358/400 |

* cited by examiner

*Primary Examiner*—Douglas Q. Tran
*Assistant Examiner*—Chan S. Park
(74) *Attorney, Agent, or Firm*—Darby & Darby P.C.

(57) ABSTRACT

A method for facsimile transmission over a packet network includes establishing a facsimile call between first and second facsimile terminals in accordance with a facsimile protocol, using a facsimile gateway to convey communications between the terminals over the packet network. The gateway awaits the arrival of a signal conveyed over the packet network from the first terminal, to be transmitted from the gateway to the second terminal as provided by the protocol, and it transmits a fill page to the second terminal if the signal does not arrive within a time limit determined in accordance with the protocol. Upon receiving the signal, the gateway transmits the signal to the second terminal after transmitting the fill page.

21 Claims, 6 Drawing Sheets

FACSIMILE TRANSMISSION OVER PACKET NETWORKS WITH DELIVERY NOTIFICATION

CROSS-REFERENCE TO RELATED APPLICATION

This application is a continuation of U.S. patent application Ser. No. 09/653,181, filed Aug. 31, 2000 now U.S. Pat. No. 6,956,677.

FIELD OF THE INVENTION

The present invention relates generally to communication systems, and specifically to systems and methods for facsimile transmission over packet networks.

BACKGROUND OF THE INVENTION

Facsimile transmissions (fax) are conventionally carried over circuits of the public switched telephone network (PSTN), in accordance with the T.30 protocol standardized by the International Telecommunications Union (ITU-T), which is incorporated herein by reference. Because of the high volume and high cost of sending faxes over the PSTN, there is increasing demand for fax services over packet networks, including fax over Internet Protocol (FoIP), frame relay and Asynchronous Transfer Mode (ATM) networks. A number of companies now offer services and equipment for fax transmission over packet networks, for example, Telogy Networks (www.telogy.com) and Miltel Telecommunication (www.milcoms.com).

Figure 1:
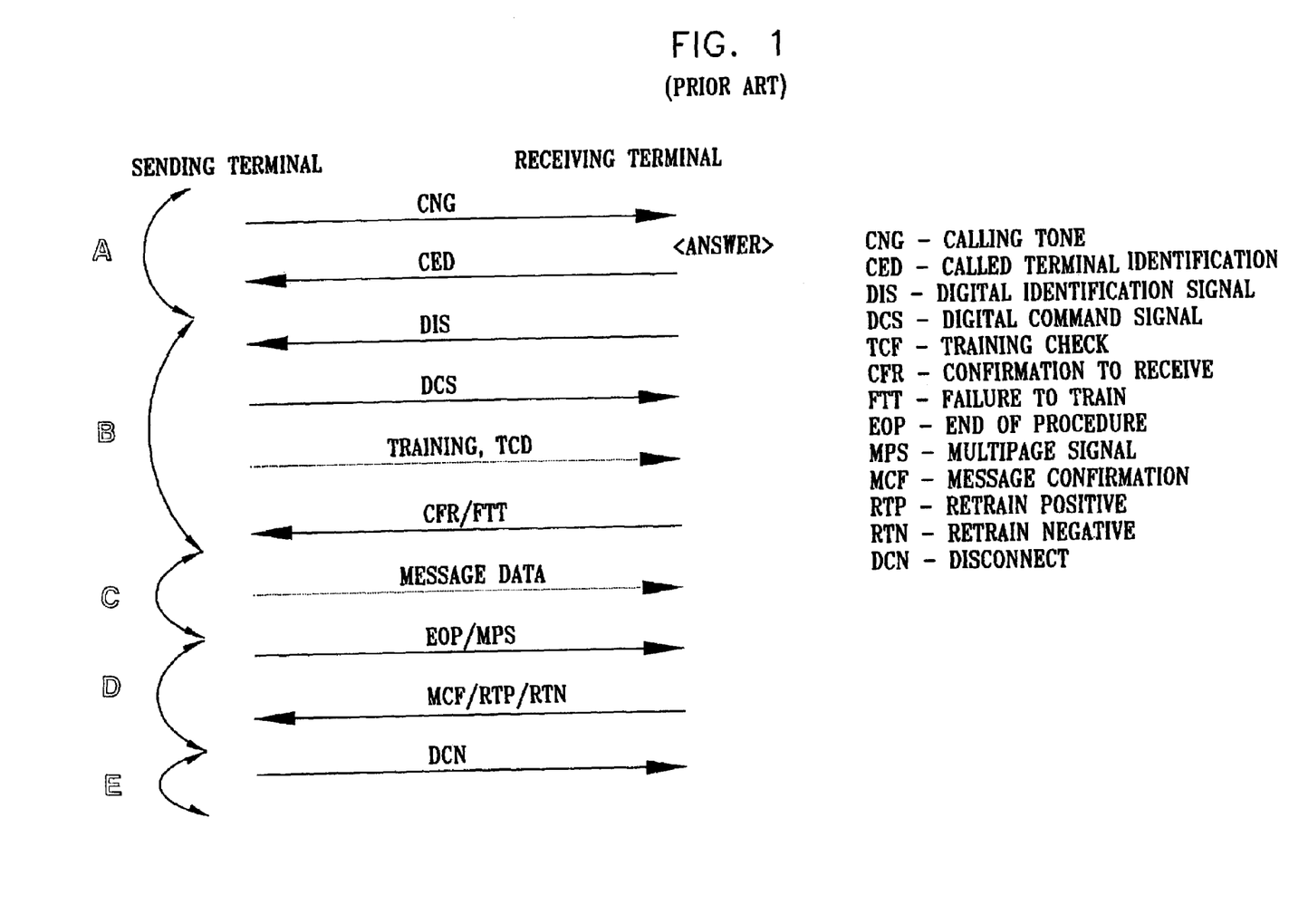
FIG. 1 is a message flow diagram that schematically illustrates elements of the T.30 fax protocol, as is known in the art.

FIG. 1 is a message flow diagram that schematically illustrates the essential elements of the T.30 protocol. The protocol is divided into five phases:

A. Call establishment—The sending fax terminal sends a calling tone (CNG), and the receiving fax terminal answers with a called terminal identification (CED).

B. Control and capabilities exchange—In this stage, the two terminals identify their capabilities and negotiate the conditions (such as data rate) of the call. The receiving terminal first sends a digital identification signal (DIS). The sending terminal responds with a digital command signal, defining the conditions of the call. It then initiates a training session with a training check field (TCF), to verify that the channel linking the calling and receiving terminals can carry the fax data at the intended data rate. The receiving terminal responds with a confirmation to receive (CFR) or a failure to train (FTT). In the case of an FTT, the training is repeated if possible, or else the call is terminated.

C. Page transfer—The sending terminal transmits a page of fax image data.

D. End of page and multi-page signaling—At the end of each page, the sending terminal sends a multi-page signal (MPS) if it has additional pages waiting to be sent, or an end of procedure (EOP) signal if there are no further pages. The receiving terminal responds with a message confirmation (MCF) to indicate that it received the page successfully and is ready to receive additional pages. Otherwise, the receiving terminal may send a retrain positive (RTP) or retrain negative (RTN) to indicate that retraining is needed before transmission can continue.

E. Call release—After receiving the last MCF from the receiving terminal, the sending terminal sends a disconnect (DCN) signal to the receiving terminal, and the call is concluded.

Disconnection may also occur when training or retraining is unsuccessful or when there is a timeout due to one of the terminals failing to respond to a message within a predetermined period. Because the T.30 protocol was defined and developed for use on circuit-switched lines, the timeout periods are generally short and strictly enforced.

The Internet Engineering Task Force (IETF) has proposed three possible models for fax over IP in Request for Comments (RFC) 2542, "Terminology and Goals for Internet Fax," by L. Masinter, which is incorporated herein by reference:

"Store and forward"—The sending terminal sends the entire (multi-page) document to a staging point, or gateway, which stores the entire document before transmitting it to the destination. The sending terminal disconnects from the staging point without waiting for confirmation of delivery from the receiving terminal. This solution is efficient and inexpensive, but does not provide fax users with the confirmed delivery to which they are accustomed.

"Real-time"—This model enables two standard fax terminals to communicate over a packet network such that all of the essential elements of the T.30 protocol are preserved between the sending and receiving terminals.

"Session"—In this model, there is no requirement that the full T.30 protocol be maintained between the sending and receiving terminals, but delivery notification should be received at the sending terminal before disconnection.

RFC 2542 does not address the question of how to achieve compatibility between these alternative models and the large base of installed fax machines, which require T.30 compliance in order to communicate. ITU-T has adopted Recommendation T.37 for store-and-forward FoIP, and Recommendation T.38 for real-time fax. These recommendations (available at www.itu.int/itudoc/itu-t/rec/t/t37.html and www.itu.int/itudoc/itu-t/rec/t/t38.html, respectively) are incorporated herein by reference. Session fax, however, has not been standardized.

Real-time fax is closest conceptually to the T.30 model and can, in principle, be implemented in a straightforward way using suitable gateways or adapters to packetize communications between the sending and receiving terminals. In practice, however, real-time fax over actual packet networks, and particularly over IP networks, is problematic because of the strict timing constraints imposed by T.30. Unlike the PSTN, IP networks are characterized by jitter, lost packets, dynamic bandwidth changes and propagation delays that may result from third-party activities. As a result, when the network becomes at all congested, packet delays are liable to result in timeout and disconnection by the sending or receiving fax terminal.

A number of methods have been proposed to forestall timeout when packet delays occur in real-time packet fax transmission. These methods are based on spoofing the sending or receiving fax terminal. Typically, when expected messages or data do not arrive on time from one of the terminals, the gateway sends the other terminal spurious, fill bits or messages, such as command repeat (CRP) signals asking the terminal to resend the last message. Methods of spoofing in the context of real-time digital fax are described, for example, in U.S. Pat. No. No. 5,828,468, whose disclosure is incorporated herein by reference. Even with spoofing capabilities, however, real-time fax is demanding of network resources and will fail when there is a packet delay of more than a few seconds, as may easily occur in a congested IP network.

SUMMARY OF THE INVENTION

In preferred embodiments of the present invention, aspects of session fax operation are integrated into a real-time packet network fax system, in order to solve the problem of network delays. A gateway establishes a real-time fax connection over the packet network between a sending fax terminal and a receiving fax terminal. When a substantial packet delay occurs in the network, the gateway enters a session fax mode in order to maintain the connection. In this mode, the gateway preferably creates one or more fill pages of fax data, and transmits the pages to the sending or receiving terminal, as required. The fill pages take the place of the real page or message that is expected from the other terminal, but has not yet arrived. Preferably, the fill pages contain a suitable message, informing a user of the terminal that a network delay has occurred. Alternatively, the gateway may insert substantially any type of content in the fill pages. When the delayed page or message finally does arrive, the gateway sends it to the terminal.

The gateway keeps track of the pages and messages that it receives, and sends the appropriate end-of-procedure or confirmation message to the sending or receiving terminal only after having received all of the expected real data and messages. In this manner, the sending terminal receives confirmation of transmission before disconnecting, even when a real-time fax connection cannot be maintained due to network constraints.

The present invention thus offers a novel solution to the inadequacy of the real-time packet fax protocol (T.38) in the face of long and unpredictable packet delays, which commonly occur in congested networks. While deviating from the T.38 standard, preferred embodiments of the present invention still maintain full compatibility with existing T.30 fax terminals. These preferred embodiments are particularly suited to fax over IP network applications, but can also be adapted for use in fax transmission over packet networks of other types, such as ATM and frame relay networks.

In preferred embodiments of the present invention, gateways with session fax capability, as described above, are linked to either or both of the sending terminal and the receiving terminal. After establishing the call, the gateway at the receiving side awaits pages of fax data from the sending terminal. When a page does not arrive in time to prevent a timeout by the receiving terminal, the gateway sends one or more fill pages. Once all of the actual fax data for the page have finally arrived, the gateway sends the complete page to the receiving terminal.

The gateway at the sending side gives the sending terminal a confirmation of receipt of each page, without necessarily waiting for an actual confirmation message from the receiving terminal. After the sending terminal has sent the last of the pages, the gateway awaits the last of the actual confirmation messages from the sending terminal. If the last confirmation message does not arrive in time to prevent a timeout, the gateway preferably performs a line turnaround, as provided by the T.30 standard, instructing the sending terminal to begin receiving pages. The gateway then sends one or more fill pages to the sending terminal, until the actual confirmation (or failure indication) has returned from the receiving terminal.

There is therefore provided, in accordance with a preferred embodiment of the present invention, a method for facsimile transmission over a packet network, including:

establishing a facsimile call between first and second facsimile terminals in accordance with a facsimile protocol, using a facsimile gateway to convey communications between the terminals over the packet network;

awaiting arrival at the gateway of a signal conveyed over the packet network from the first terminal, to be transmitted from the gateway to the second terminal as provided by the protocol;

transmitting a fill page from the gateway to the second terminal if the signal does not arrive within a time limit determined in accordance with the protocol; and receiving the signal at the gateway and transmitting the signal from the gateway to the second terminal after transmitting the fill page.

Preferably, the facsimile protocol includes a T.30 protocol of the International Telecommunications Union (ITU-T), and the packet network operates in accordance with an Internet Protocol (IP). Further preferably, establishing the facsimile call includes establishing a real-time fax over IP connection, and transmitting the fill page includes initiating a session fax mode of communication in response to a network delay causing the signal to fail to arrive within the time limit. Most preferably, establishing the real-time fax over IP connection includes establishing the connection in accordance with an ITU-T T.38 protocol.

In one preferred embodiment, the first terminal includes a sending terminal, and the second terminal includes a receiving terminal, and awaiting the arrival of the signal includes awaiting transmission of a complete page of facsimile data from the sending terminal. Preferably, the gateway includes a receiving gateway linked to the receiving terminal by a telephone line, and awaiting the transmission of the complete page includes awaiting the transmission of the complete page by a sending gateway linked to the sending terminal.

Preferably, the method includes awaiting arrival of a training message indicative of capabilities of the first terminal and conveyed over the packet network from the first terminal, and if the training message does not arrive within a training time limit determined in accordance with the protocol, initiating a default training sequence between the gateway and the second terminal, substantially independently of the capabilities of the first terminal.

In another preferred embodiment, the first terminal includes a receiving terminal, and the second terminal includes a sending terminal, which sends at least one page of facsimile data to the receiving terminal over the packet network using the facsimile gateway during the facsimile call, and awaiting the arrival of the signal includes awaiting a notification of delivery of the at least one page to the receiving terminal. Preferably, transmitting the fill page includes instructing the sending terminal to perform a line turnaround in order to receive the fill page. Additionally or alternatively, the at least one page of facsimile data includes first and second pages of facsimile data, and transmitting a confirmation signal from the gateway to the sending terminal after receiving the first page from the sending terminal at the gateway, responsive to which the sending terminal sends the second page to the gateway, before receiving a confirmation packet at the gateway over the network indicating that the first page was received at the receiving terminal.

There is also provided, in accordance with a preferred embodiment of the present invention, a method for facsimile transmission over a packet network, including:

establishing a facsimile call between a sending terminal and a facsimile gateway in communication with the packet network;

receiving a first page of facsimile data from the sending terminal at the gateway;

conveying the first page of the facsimile data from the gateway over the packet network to a receiving terminal;

transmitting a confirmation signal from the gateway to the sending terminal after receiving the first page at the gateway, without having waited to receive a first confirmation packet over the network indicating that the first page was received at the receiving terminal;

responsive to transmitting the confirmation signal, receiving a second page of facsimile data from the sending terminal;

conveying the second page of the facsimile data over the packet network to the receiving terminal;

awaiting arrival at the gateway of the first confirmation packet and of a second confirmation packet over the network indicating that the second page was received at the receiving terminal; and responsive to the first and second confirmation packets, sending a notification from the gateway to the sending terminal before terminating the facsimile call that the pages were delivered to the receiving terminal.

Preferably, establishing the facsimile call includes initiating a real-time fax over IP connection, and sending the notification includes completing the call in a session fax mode. Further preferably, establishing the facsimile call includes establishing the call over a telephone line between the sending terminal and the facsimile gateway, wherein the gateway includes a sending gateway, and wherein conveying the first and second pages of the facsimile data includes conveying the pages from the sending gateway over the packet network to a receiving gateway, which transmits the pages to the receiving terminal.

There is further provided, in accordance with a preferred embodiment of the present invention, apparatus for facsimile transmission over a packet network, including a computer gateway, in communication with the packet network and configured to establish a facsimile call between first and second facsimile terminals in accordance with a facsimile protocol and to convey communications between the terminals over the packet network during the call, the gateway being adapted to await arrival of a signal conveyed over the packet network from the first terminal, which signal is to be transmitted from the gateway to the second terminal as provided by the protocol, and to transmit a fill page to the second terminal if the signal does not arrive within a time limit determined in accordance with the protocol, and upon receiving the signal, to transmit the signal to the second terminal after transmitting the fill page.

There is moreover provided, in accordance with a preferred embodiment of the present invention, apparatus for facsimile transmission over a packet network, including a computer gateway, in communication with the network and configured to establish a facsimile call with a sending terminal, the gateway being adapted to receive a first page of facsimile data from the sending terminal, to convey the first page of the facsimile data over the packet network to a receiving terminal, and to transmit a confirmation signal to the sending terminal after receiving the first page without having waited to receive a first confirmation packet over the network indicating that the first page was received at the receiving terminal, and further being adapted to receive, responsive to the confirmation signal, a second page of facsimile data from the sending terminal and to convey the second page of the facsimile data over the packet network to the receiving terminal, and still further being adapted to await arrival over the network of the first confirmation packet and of a second confirmation packet indicating that the second page was received at the receiving terminal and, responsive to the first and second confirmation packets, to send a notification to the sending terminal before terminating the facsimile call that the pages were delivered to the receiving terminal.

There is furthermore provided, in accordance with a preferred embodiment of the present invention, a computer software product for facsimile transmission over a packet network, including a computer-readable medium in which program instructions are stored, which instructions, when read by a facsimile gateway computer in communication with the packet network, cause the computer to establish a facsimile call between first and second facsimile terminals in accordance with a facsimile protocol and to convey communications between the terminals over the packet network, to await arrival of a signal conveyed over the packet network from the first terminal to be transmitted from the computer to the second terminal as provided by the protocol, to transmit a fill page to the second terminal if the signal does not arrive within a time limit determined in accordance with the protocol, and upon receiving the signal, to transmit the signal to the second terminal after transmitting the fill page.

There is additionally provided, in accordance with a preferred embodiment of the present invention, a computer software product for facsimile transmission over a packet network, including a computer-readable medium in which program instructions are stored, which instructions, when read by a facsimile gateway computer in communication with the packet network, cause the computer to establish a facsimile call with a sending terminal, to receive a first page of facsimile data from the sending terminal, to convey the first page of the facsimile data over the packet network to a receiving terminal, and to transmit a confirmation signal to the sending terminal after receiving the first page without having waited to receive a first confirmation packet over the network indicating that the first page was received at the receiving terminal, and further cause the computer to receive a second page of facsimile data from the sending terminal responsive to transmitting the confirmation signal, and to convey the second page of the facsimile data over the packet network to the receiving terminal, and still further cause the computer to await arrival over the network of the first confirmation packet and of a second confirmation packet indicating that the second page was received at the receiving terminal, and responsive to the first and second confirmation packets, to send a notification to the sending terminal before terminating the facsimile call that the pages were delivered to the receiving terminal.

The present invention will be more fully understood from the following detailed description of the preferred embodiments thereof, taken together with the drawings in which:

DETAILED DESCRIPTION OF PREFERRED EMBODIMENTS

Figure 2:
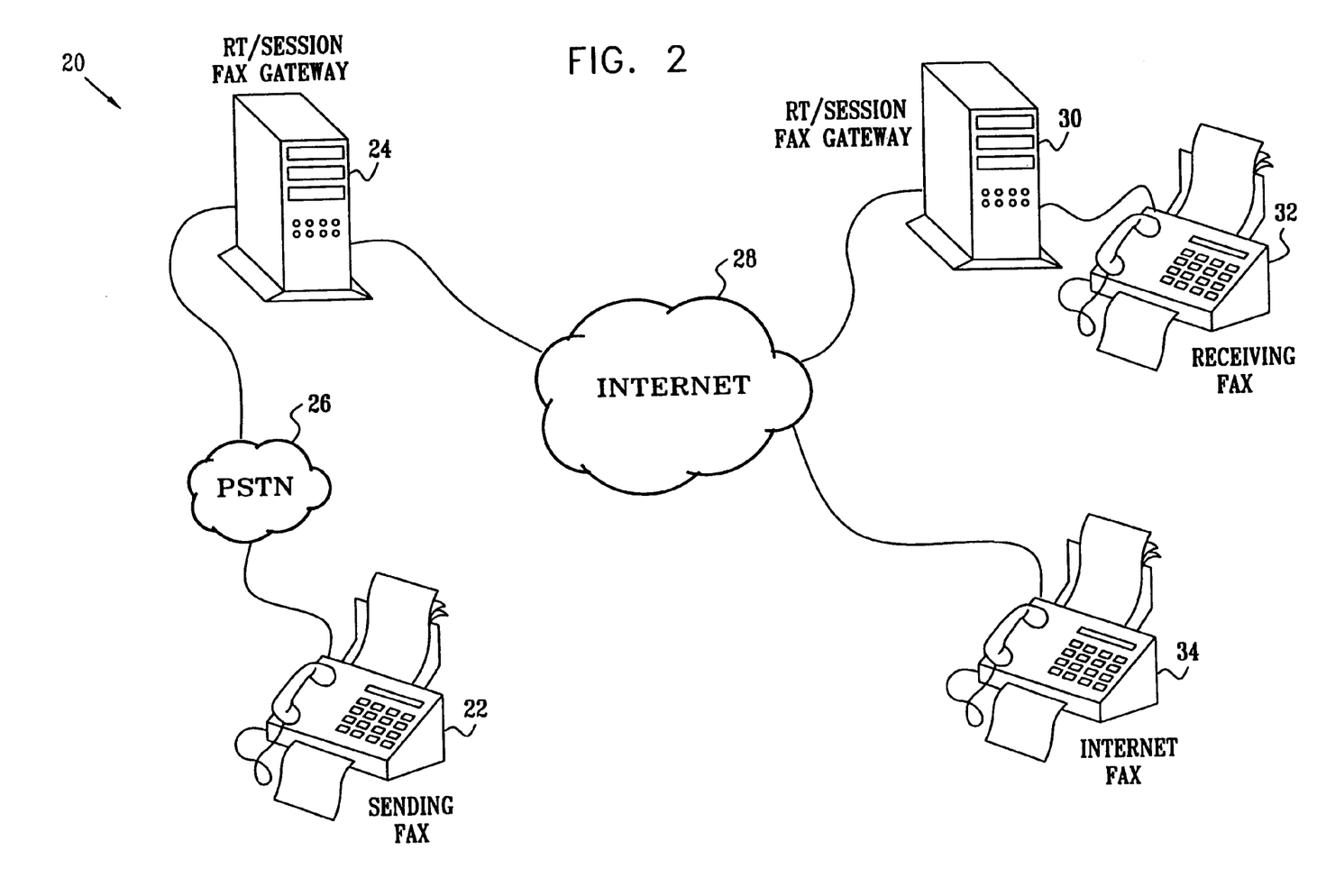
FIG. 2 is a schematic, pictorial illustration of a system for fax transmission over a packet network, in accordance with a preferred embodiment of the present invention.

FIG. 2 is a schematic, pictorial illustration of a system 20 for fax transmission over a packet network 28, in accordance with a preferred embodiment of the present invention. Typically, network 28 comprises an IP network, as shown in the figure, although the principles of the present invention are also applicable to fax transmission over packet networks of other types. System 20 enables a sending fax terminal 22 to communicate over network 28 with a receiving fax terminal 32. Terminals 22 and 32 typically comprise standard T.30 fax machines. Alternatively, terminal 22 and/or 32 may comprise substantially any T.30-compatible device, such as a computer with a suitable fax modem, or a mobile telephone with fax capability. The system also enables terminals 22 and 32 to communicate with an Internet-compatible fax machine 34, such as a fax machine having an integral adapter for T.38 operation.

Terminals 22 and 32 communicate over network 28 by means of respective fax gateways 24 and 30. Connection between the terminals and the respective gateways is typically made via a circuit-switched network 26, such as a PSTN, as is known in the art. Alternatively, the connection may be made by a point-to-point line or private exchange. As described in detail hereinbelow, gateways 24 and 30 are configured for real-time fax communications, preferably in accordance with the T.38 protocol, and automatically switch to a session fax mode in response to network packet delays. Typically, gateways 24 and 30 comprise general-purpose computers having suitable modems for communicating with terminals 22 and 32 and network interfaces for communicating over network 28. The gateways preferably carry out their fax communications under the control of suitable software, which may be downloaded to the gateways in electronic form or furnished on tangible media, such as CD-ROM or non-volatile memory.

Figure 3:
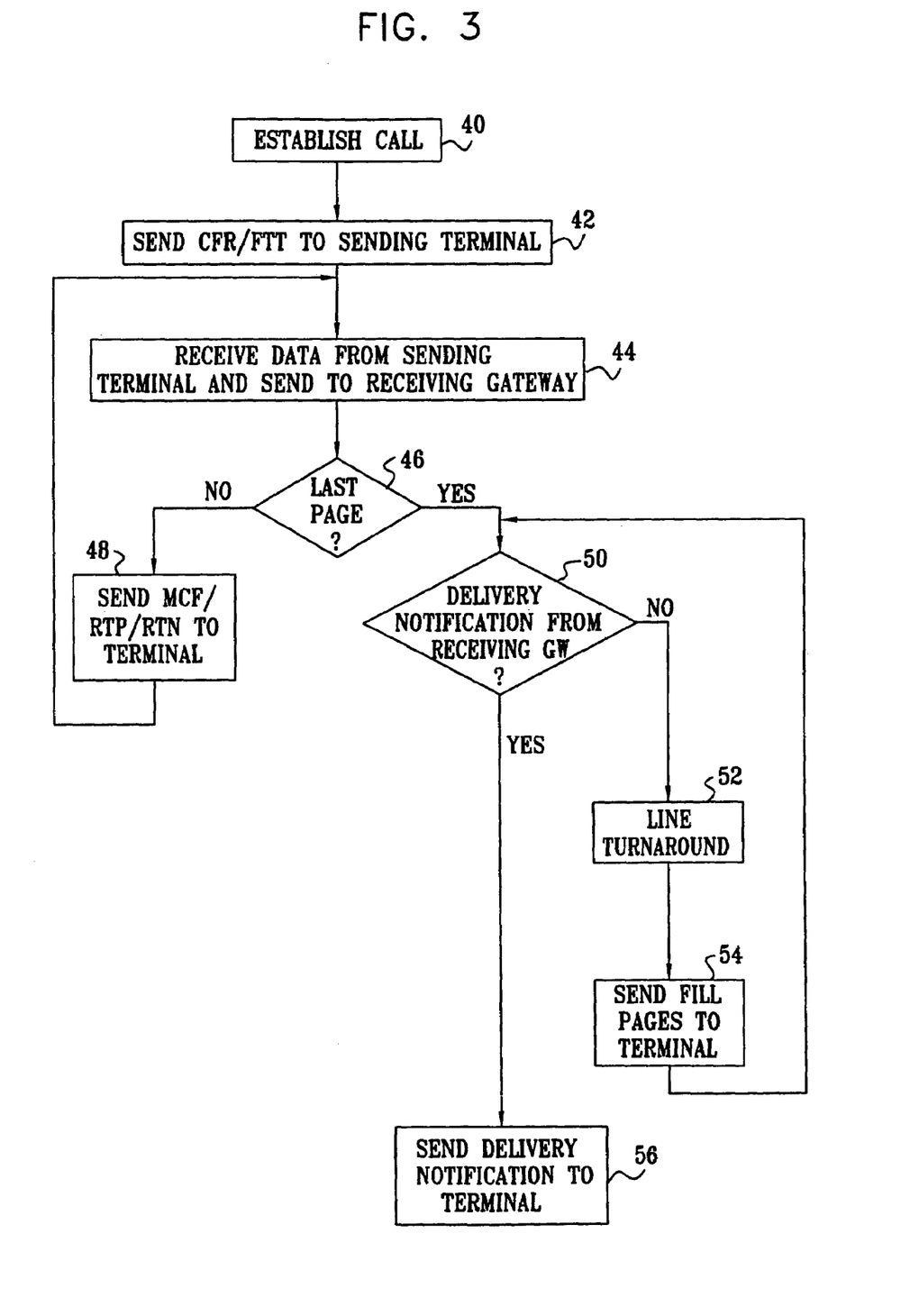
FIG. 3 is a flow chart that schematically illustrates a method for sending a fax over a packet network, in accordance with a preferred embodiment of the present invention.

FIG. 3 is a flow chart that schematically illustrates a method of communications between sending terminal 22 and gateway 24, in accordance with a preferred embodiment of the present invention. At a call establishment step 40, terminal 22 places a fax call to terminal 32. The call is preferably routed automatically to gateway 24, as described, for example, in the above-mentioned U.S. Pat. No. 5,828,468. Alternatively, terminal 22 may place the fax call to gateway 24, with further instructions requesting that the call be routed to terminal 32. In either case, gateway 24 signals gateway 30 via network 28, and gateway 30 establishes the call with terminal 32. Following the CNG and CED signals (shown in FIG. 1), gateway 30 receives a DIS from terminal 32 and passes it (in packetized form) to gateway 24 for delivery to terminal 22. Terminal 22 sends the DCS, training and TCF signals to gateway 24. (These and some other standard signals are omitted from the figures for the sake of simplicity.) The gateway replies with a CFR or FTT signal, depending on the quality of the connection between gateway 24 and terminal 22, at a training conclusion step 42.

With the training complete, terminal 22 begins sending data to gateway 24, at a data transmission step 44. Gateway 24 packetizes the data and transmits the packets over network 28 to gateway 30. At the conclusion of each page, in accordance with the T.30 standard, terminal 22 sends either a MPS, indicating that additional pages are yet to come, or an EOP signal (not shown in the figure). Gateway 24 receives the MPS or EOP signal, and thus determines whether or not the current page is the last one, at a page decision step 46. If the current page was not the last one, gateway 24 returns to terminal 22 a MCF if it received the page satisfactorily, or a RTP/RTN signal if not, at a confirmation step 48. The gateway sends this message without waiting for a confirmation or other signal from terminal 32 (via gateway 30). This mode of communication enables terminal 22 to continue transmission without timing out, even when there are delays on network 28 between gateways 24 and 30. Meanwhile, gateway 24 notes the confirmation signals that it receives from gateway 30 in order to track the number of pages that terminal 32 has actually received.

Terminal 22 continues sending additional pages at step 44 until the last page has been reached.

Once the last page has been received, followed by an EOP signal from terminal 22, gateway 24 checks to determine whether gateway 30 has sent back a notification that the last of the pages has been delivered to receiving terminal 32, at a notification checking step 50. If the delays in network 28 are minimal, this notification will be received within the time limit prescribed by the T.30 and T.38 standards. In this case, gateway 24 immediately sends the delivery notification to terminal 22 in response to the last fax page in the form of a MCF (or RTP/RTN), at a delivery notification step 56.

If the delivery notification at step 50 is not received in time, however, gateway 24 initiates a line turnaround, at a turnaround step 52. Line turnaround is a function provided by the T.30 standard to enable services such as polling, whereby a first fax machine initiates a call to a second one, after which the second fax machine transmits pages back to the first one. Server 24 uses this function in a novel way to prevent terminal 22 from timing out. Following the turnaround, gateway 24 sends one or more fill-pages to terminal 22, at a page delay step 54. Preferably, the fill pages carry a message to an operator of terminal 22, such as "Delivery confirmation delayed due to network lag," for example. When gateway 24 finally receives the delivery notification from gateway 30, it sends the delivery notification (or a notification that delivery was unsuccessful) to terminal 22, at step 56.

Figure 4:
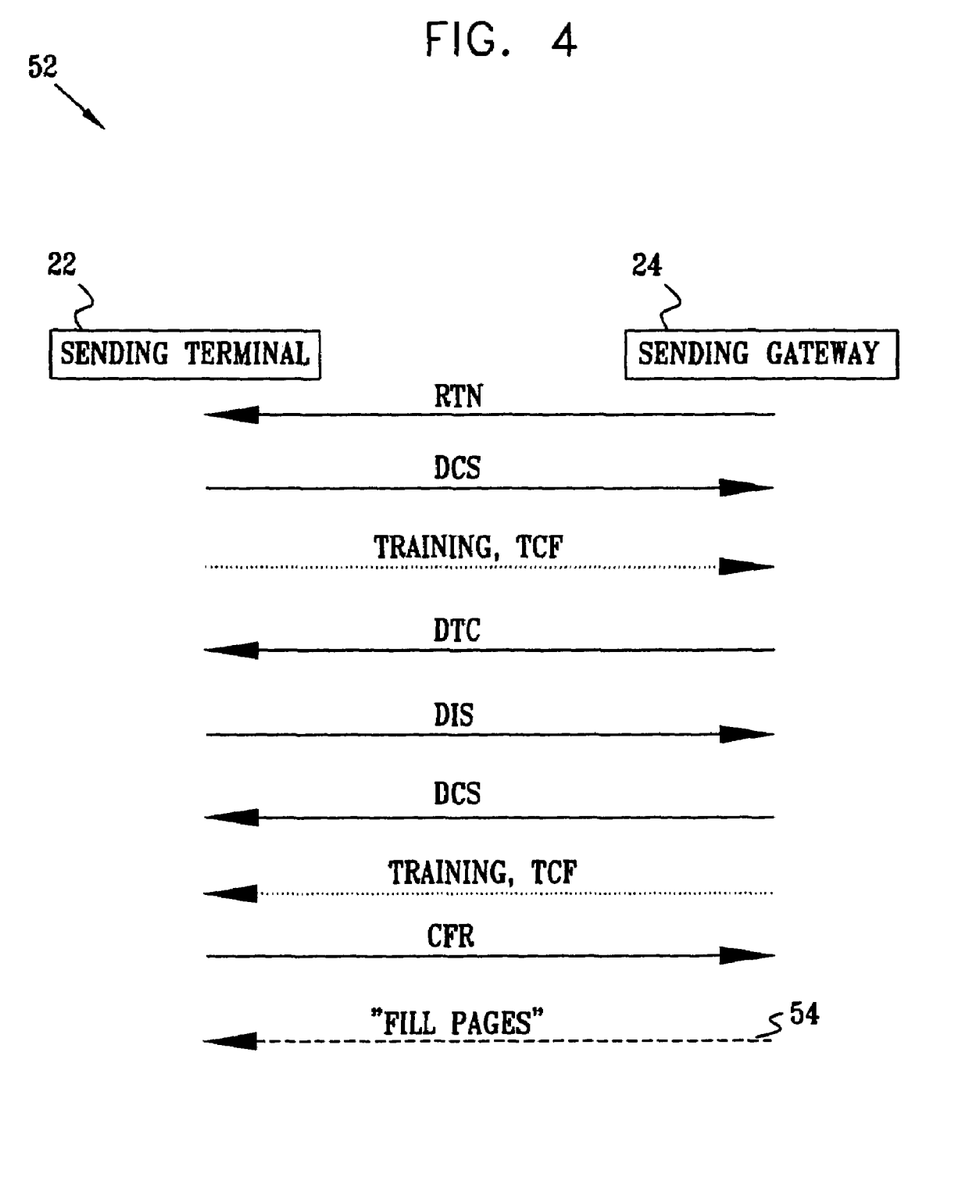
FIG. 4 is a message flow diagram illustrating a detail of the method of FIG. 3, in accordance with a preferred embodiment of the present invention.

FIG. 4 is a message flow diagram showing details of turnaround step 52, in accordance with a preferred embodiment of the present invention. After receiving the EOP from terminal 22 at step 46, and failing to receive delivery notification in time, gateway 24 sends a RTN signal to terminal 22. In response to the RTN, terminal 22 returns to phase B, in accordance with the T.30 protocol, and sends DCS, training and TCF signals to gateway 24. The gateway then initiates the turnaround with a digital transmit command (DTC) to the terminal, which is the signal provided by T.30 for initiating line turnaround.

Sending the DTC at this point is a violation of the conventional T.30 protocol on the part of gateway 24.

Because DTC is itself a standard message, however, an ordinary T.30 fax machine, such as terminal 22, will still have no problem in responding to it. Terminal 22 replies to the DTC by sending a DIS to gateway 24, and the gateway responds with a DCS, training and TCF signals. Upon receiving the CFR from terminal 22, gateway 24 begins to send the fill pages of step 54. The last page sent by gateway 24 will typically be the delivery notification of step 56. Alternatively, the delivery notification may take the form of a special ring invoked at terminal 22.

Figure 5:
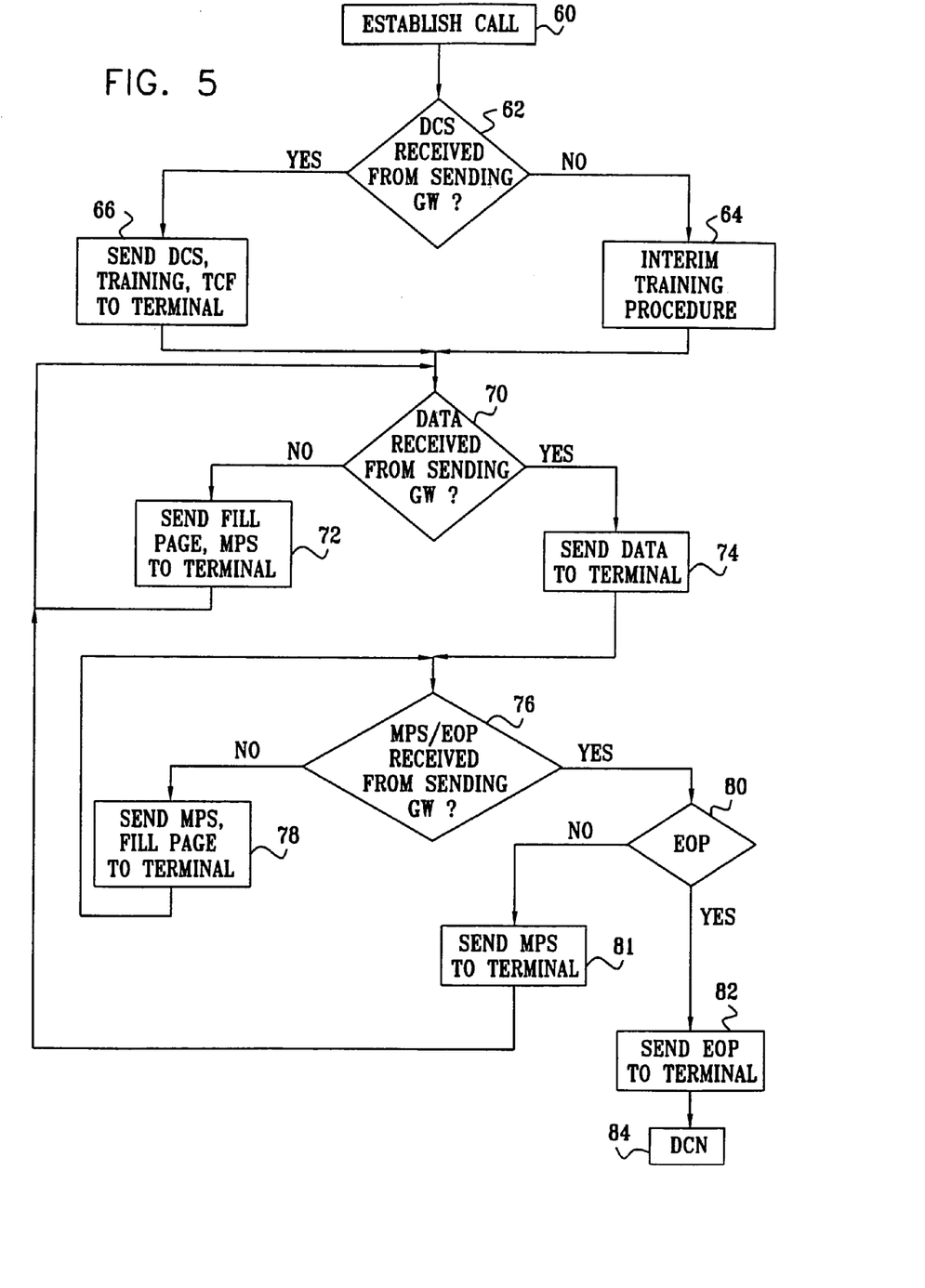
FIG. 5 is a flow chart that schematically illustrates a method for receiving a fax over a packet network, in accordance with a preferred embodiment of the present invention.

FIG. 5 is a flow chart that schematically illustrates a method of communication between gateway 30 and receiving terminal 32, in accordance with a preferred embodiment of the present invention. At a call establishment step 60, after receiving the request from gateway 24 to open the call, gateway 30 sends a CNG to terminal 32 and receives the terminal's CED in return. Gateway 30 then receives the DIS from terminal 32 and awaits a DCS packet from gateway 24, at a DCS reception step 62. If the DCS packet is not received in time to prevent a timeout by terminal 32, gateway 30 sends its own, default DCS to terminal 32, followed by training and TCF signals, at an interim training step 64. This step is described in detail hereinbelow with reference to FIG. 6. When the training is complete, terminal 32 sends a CFR signal to gateway 30 (not shown in the figure).

Once the training has been completed, gateway 30 waits for data from gateway 24, at a data reception step 70. Preferably, gateway 30 waits to receive a complete page of data before sending it on to terminal 32. If a complete page of data is not received in time to prevent a timeout by terminal 32, gateway 30 sends one or more fill pages, at a page delay step 72. As in the example of FIG. 3, these pages preferably carry a message to the operator of terminal 32, such as "Network delay encountered—awaiting data." Alternatively, gateway 30 may begin sending data to terminal 32 after only part of a page has been received from gateway 24. In this case, if the gateway 30 is unable to send the remainder of the page in time, terminal 32 may send a RTN or RTP response to gateway 30. Gateway 30 then handles the retraining procedure appropriately while waiting to receive the remainder of the page from gateway 24.

Once gateway 30 has received a full page of data, it sends the page to terminal 32, at a data sending step 74. The page ends with a return-to-control (RTC) signal (which is a sequence of six end-of-line (EOL) characters), in accordance with the T.30 standard. At a page end step 76, gateway 30 awaits a MPS or EOP packet from gateway 24, marking the end of the page. If neither signal is received in time to prevent a timeout, gateway 30 sends a MPS to terminal 32, at a multi-page step 78. Gateway 30 may also send fill pages if necessary, while awaiting the actual MPS or EOP packet from gateway 24.

When the MPS or EOP packet does arrive from gateway 24, at a page end signal step 80, gateway 30 decides what signal to send to terminal 32. If the packet carries a MPS, gateway 30 sends the MPS to terminal 32 at an additional multi-page step 81. The gateway then waits for the next page of data at step 70. On the other hand, if the packet carries an EOP signal, gateway 30 sends the EOP to terminal 32, at an EOP step 82, after it has finished sending any fill page that has been required. When terminal 32 has received the final page and the EOP, it returns a MCF to the gateway (not shown in the figure). Gateway 30 returns the packetized MCF to gateway 24, and sends a DCN signal to terminal 32, terminating the call, at a final step 84.

Figure 6:
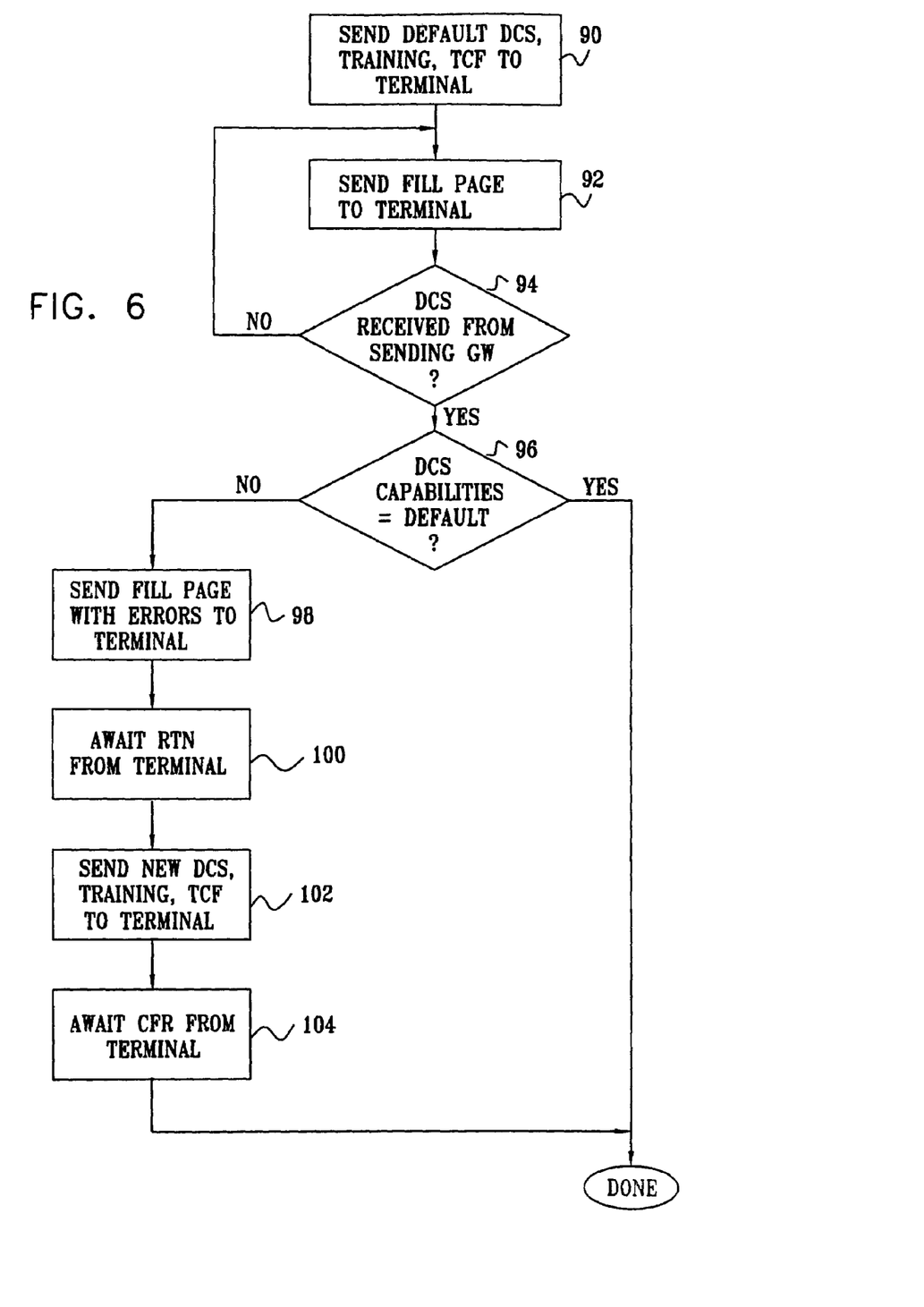
FIG. 6 is a flow chart that schematically illustrates a retraining procedure used in delivering a fax transmitted over a packet network, in accordance with a preferred embodiment of the present invention.

FIG. 6 is a flow chart that schematically illustrates details of interim retraining step 64, in accordance with a preferred embodiment of the present invention. As noted above, this step is invoked when gateway 30 fails to receive a DCS packet from gateway 24 in time to train terminal 32 accordingly. Instead, at a default DCS step 90, gateway 30 sends its own, default DCS to terminal 32, followed by training and TCF signals. If necessary, it then sends the terminal one or more fill pages, at a fill step 92, while waiting for the DCS packet to arrive.

When the DCS packet does finally arrive from gateway 24, at a DCS reception step 94, gateway 30 determines whether the sender capabilities indicated by this "real" DCS match the default capabilities negotiated with terminal 32, at a capabilities checking step 96. If there is a discrepancy in the capabilities, gateway 30 initiates a new capabilities exchange and training phase with terminal 32. In order to invoke this exchange, at an error page step 98, gateway 30 sends terminal 32 a fill page in which it has deliberately created errors. The errors cause terminal 32 to return a RTN signal to gateway 30, at a retraining initiation step 100. Gateway 30 responds by sending new DCS, training and TCF signals, at a new DCS step 102. At this step, the capabilities are set to match the capabilities reported in the DCS packet from gateway 24, instead of the default capabilities negotiated previously. The retraining is completed upon receipt of a CFR signal from terminal 32, at a CFR step 104. At this point, gateway 30 proceeds to wait for data from gateway 24 at step 70 (FIG. 5), as described above.

It will be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for facsimile transmission over a packet network, comprising:
   establishing a facsimile call between first and second facsimile terminals in accordance with a facsimile protocol, using a facsimile gateway to convey communications between the terminals over the packet network;
   awaiting arrival at the gateway of a complete page of actual facsimile data conveyed over the packet network from the first terminal, to be transmitted from the gateway to the second terminal as provided by the protocol;
   transmitting a fill page from the gateway to the second terminal if the complete page of actual facsimile data does not arrive within a time limit determined in accordance with the protocol, the fill page comprising at least one entire page of content that is created by the gateway; and
   receiving the complete page of actual facsimile data at the gateway and transmitting the complete page from the gateway to the second terminal after transmitting the fill page.

2. A method according to claim 1, wherein the facsimile protocol comprises a T.30 protocol of the International Telecommunications Union (ITU-T).

3. A method according to claim 2, wherein the packet network operates in accordance with an Internet Protocol (IP).

4. A method according to claim 3, wherein establishing the facsimile call comprises establishing a real-time fax over IP connection, and wherein transmitting the fill page comprises initiating a session fax mode of communication in response to a network delay causing the signal to fail to arrive within the time limit.

5. A method according to claim 4, wherein establishing the real-time fax over IP connection comprises establishing the connection in accordance with an ITU-T T.38 protocol.

6. A method according to claim 1, wherein the first terminal comprises a sending terminal, and the second terminal comprises a receiving terminal, and wherein awaiting the arrival of the complete page comprises awaiting transmission of the complete page of facsimile data from the sending terminal.

7. A method according to claim 6, wherein the gateway comprises a receiving gateway linked to the receiving terminal by a telephone line, and wherein awaiting the transmission of the complete page comprises awaiting the transmission of the complete page by a sending gateway linked to the sending terminal.

8. A method according to claim 1, and comprising awaiting arrival of a training message indicative of capabilities of the first terminal and conveyed over the packet network from the first terminal, and if the training message does not arrive within a training time limit determined in accordance with the protocol, initiating a default training sequence between the gateway and the second terminal, substantially independently of the capabilities of the first terminal.

9. A method for facsimile transmission over a packet network, comprising:
  establishing a facsimile call between first and second facsimile terminals in accordance with a facsimile protocol, using a facsimile gateway to convey communications between the terminals over the packet network, wherein the first terminal comprises a receiving terminal, and the second terminal comprises a sending terminal, which sends at least one page of facsimile data to the receiving terminal over the packet network using the facsimile gateway during the facsimile call;
  awaiting arrival at the gateway of a signal conveyed over the packet network from the first terminal, to be transmitted from the gateway to the second terminal as provided by the protocol, the signal comprising a notification of delivery of the at least one page to the receiving terminal;
  transmitting a fill page, comprising at least one entire page, from the gateway to the second terminal if the signal does not arrive within a time limit determined in accordance with the protocol, wherein transmitting the fill page comprises instructing the sending terminal to perform a line turnaround in order to receive the fill page; and
  receiving the signal at the gateway and transmitting the signal from the gateway to the second terminal after transmitting the fill page.

10. A method according to claim 9, wherein the at least one page of facsimile data comprises first and second pages of facsimile data, and comprising transmitting a confirmation signal from the gateway to the sending terminal after receiving the first page from the sending terminal at the gateway, responsive to which the sending terminal sends the second page to the gateway, before receiving a confirmation packet at the gateway over the network indicating that the first page was received at the receiving terminal.

11. Apparatus for facsimile transmission over a packet network, comprising a computer gateway, in communication with the packet network and configured to establish a facsimile call between first and second facsimile terminals in accordance with a facsimile protocol and to convey communications between the terminals over the packet network during the call, the gateway being adapted to await arrival of a complete page of actual facsimile data conveyed over the packet network from the first terminal, which complete page is to be transmitted from the gateway to the second terminal as provided by the protocol, and to transmit a fill page, comprising at least one entire page of content that is created by the gateway, to the second terminal if the complete page of actual facsimile data does not arrive within a time limit determined in accordance with the protocol, and upon receiving the complete page of actual facsimile data, to transmit the complete page to the second terminal after transmitting the fill page.

12. Apparatus according to claim 11, wherein the facsimile protocol comprises a T.30 protocol of the International Telecommunications Union (ITU-T).

13. Apparatus according to claim 12, wherein the packet network operates in accordance with an Internet Protocol (IP).

14. Apparatus according to claim 13, wherein the gateway is adapted to establish a real-time fax over IP connection, and to initiate a session fax mode of communication in response to a network delay causing the signal to fail to arrive within the time limit, wherein the fill page is transmitted in the session fax mode.

15. Apparatus according to claim 14, wherein the gateway is adapted to establish the real-time fax over IP connection in accordance with an ITU-T T.38 protocol.

16. Apparatus according to claim 11, wherein the first terminal comprises a sending terminal, and the second terminal comprises a receiving terminal, and wherein the complete page of actual facsimile data awaited by the gateway comprises a transmission of the complete page of facsimile data from the sending terminal.

17. Apparatus according to claim 16, wherein the gateway comprises a receiving gateway linked to the receiving terminal by a telephone line, and wherein the complete page is transmitted by a sending gateway linked to the sending terminal.

18. Apparatus according to claim 11, wherein the gateway is further adapted to await arrival of a training message conveyed over the packet network from the first terminal, indicative of capabilities of the first terminal, and if the training message does not arrive within a training time limit determined in accordance with the protocol, to initiate a default training sequence with the second terminal, substantially independently of the capabilities of the first terminal.

19. Apparatus for facsimile transmission over a packet network, comprising a computer gateway, in communication with the packet network and configured to establish a facsimile call between first and second facsimile terminals in accordance with a facsimile protocol and to convey communications between the terminals over the packet network during the call, wherein the first terminal comprises a receiving terminal, and the second terminal comprises a sending terminal, which is adapted to send at least one page of facsimile data to the receiving terminal over the packet network using the facsimile gateway during the facsimile call,
  the gateway being adapted to await arrival of a signal conveyed over the packet network from the first terminal, the signal comprising a notification of delivery of the at least one page to the receiving terminal, which signal is to be transmitted from the gateway to the second terminal as provided by the protocol, and to transmit a fill page, comprising at least one entire page, to the second terminal if the signal does not arrive within a time limit determined in accordance with the protocol, wherein the gateway is adapted to instruct the sending terminal to perform a line turnaround in order to receive the fill page, and upon receiving the signal, to transmit the signal to the second terminal after transmitting the fill page.

20. Apparatus according to claim 19, wherein the at least one page of facsimile data comprises first and second pages of facsimile data, and wherein the gateway is adapted to transmit a confirmation signal to the sending terminal after receiving the first page from the sending terminal, responsive to which confirmation signal the sending terminal sends the second page to the gateway, before the gateway receives a confirmation packet over the network indicating that the first page was received at the receiving terminal.

21. A computer software product for facsimile transmission over a packet network, comprising a computer-readable medium in which program instructions are stored, which instructions, when read by a facsimile gateway computer in communication with the packet network, cause the computer to establish a facsimile call between first and second facsimile terminals in accordance with a facsimile protocol and to convey communications between the terminals over the packet network, to await arrival of a complete page of actual facsimile data conveyed over the packet network from the first terminal to be transmitted from the computer to the second terminal as provided by the protocol, to transmit a fill page, comprising at least one entire page of content that is created by the gateway, to the second terminal if the complete page of actual facsimile data does not arrive within a time limit determined in accordance with the protocol, and upon receiving the complete page of actual facsimile data, to transmit the complete page to the second terminal after transmitting the fill page.

* * * * *